United States Patent [19]
Nishihira et al.

[11] Patent Number: 6,166,640
[45] Date of Patent: Dec. 26, 2000

[54] BICOLOR INDICATOR LAMP FOR ROOM OCCUPANCY SENSOR

[75] Inventors: Thomas S. Nishihira, Newark; David A. Blau, Cupertino, both of Calif.

[73] Assignee: Hubbell Incorporated, Orange, Conn.

[21] Appl. No.: 09/340,113

[22] Filed: Jun. 28, 1999

[51] Int. Cl.[7] .................................................. G08B 23/00
[52] U.S. Cl. ........................ 340/573.1; 340/540; 340/567; 362/276
[58] Field of Search .................................. 340/573.1, 540, 340/567, 565, 815.43, 815.45, 541; 362/276

[56] References Cited

U.S. PATENT DOCUMENTS

| | | | |
|---|---|---|---|
| 4,874,962 | 10/1989 | Hermans | 307/116 |
| 5,619,185 | 4/1997 | Ferraro | 340/568 |
| 5,699,243 | 12/1997 | Eckel et al. | 364/140 |
| 5,763,872 | 6/1998 | Ness | 250/214 AL |
| 5,821,642 | 10/1998 | Nishhira et al. | 307/127 |
| 5,867,099 | 2/1999 | Keeter | 340/567 |
| 5,946,209 | 8/1999 | Eckel et al. | 364/143 |
| 5,971,597 | 10/1999 | Baldwin et al. | 364/528.12 |
| 5,984,513 | 11/1999 | Baldwin | 364/528.21 |
| 6,057,776 | 5/2000 | Sargent | 340/644 |

*Primary Examiner*—Daniel J. Wu
*Assistant Examiner*—Sihong Huang
*Attorney, Agent, or Firm*—Stacey J. Longanecker; Alfred N. Goodman

[57] ABSTRACT

A bicolor indicator is provided for a lighting control system which controllably switches one or more lkighting fixtures on or off in accordance with detected motion, ambient light level and a selected time out period. The indicator indicates when the lighting control system is operating in a bypass on or off mode (i.e., overriding controlled switching based on motion detection and ambient light level) or in an automatic time out mode. The indicator also indicates occurrences of motion detection and whether or not the ambient light level is exceeded.

10 Claims, 5 Drawing Sheets

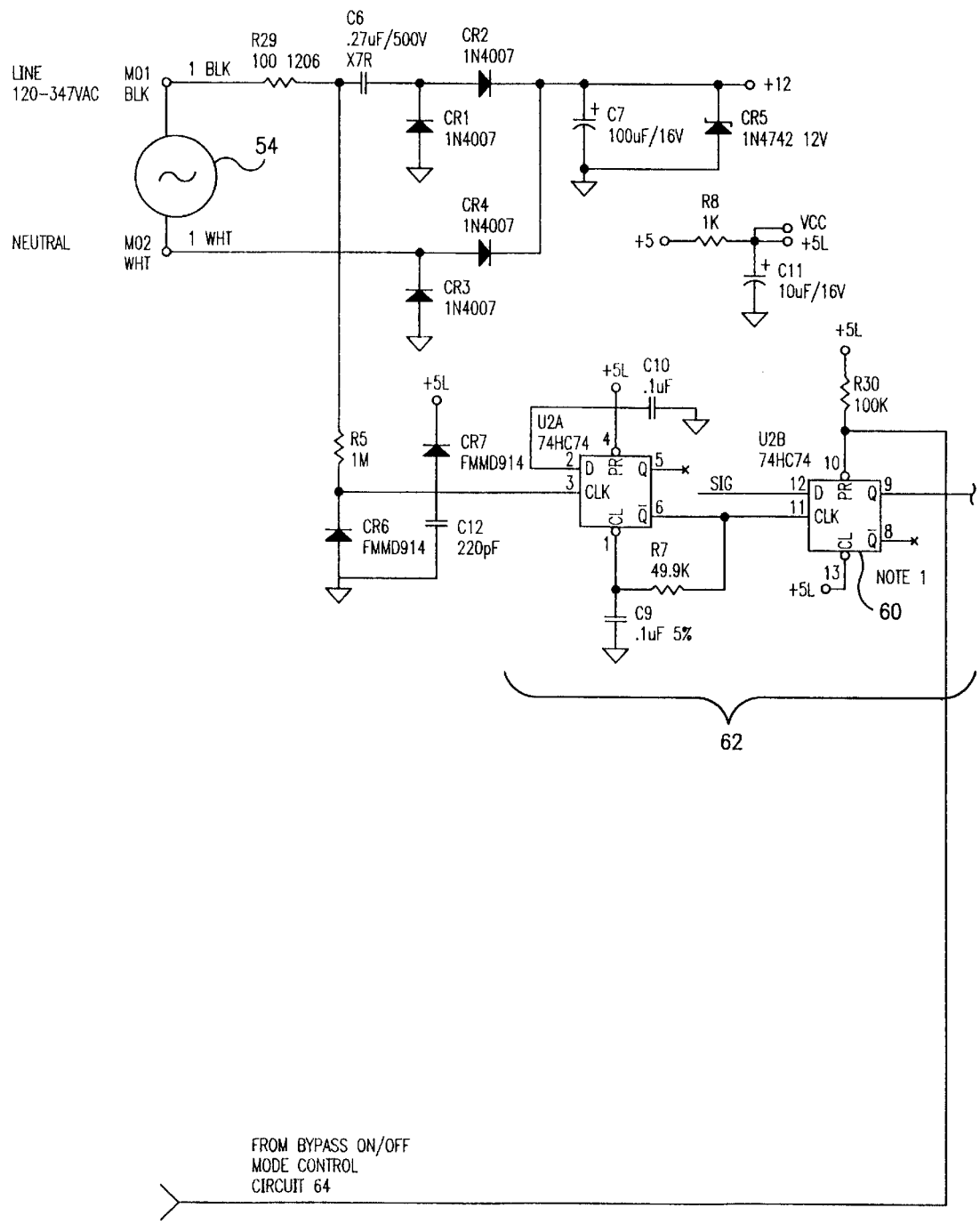
FIG. 2B-I

BICOLOR INDICATOR LAMP FOR ROOM OCCUPANCY SENSOR

CROSS REFERENCE TO RELATED APPLICATIONS

Related subject matter is disclosed in copending U.S. Patent Application of Thomas S. Nishihira and David A. Blau, entitled "Apparatus And Method For Providing Bypass Functions For A Motion Sensor Switch" (attorney's file 38422); and in copending U.S. Patent Application of Thomas S. Nishihira and David A. Blau, entitled "Apparatus And Method For Limiting Leakage To Ground Current While Optimizing Output Of A Power Supply Adaptable For Use With A Motion Sensor Switch" (attorney's file 38423), said applications being filed even date herewith and the entire contents of each being expressly incorporated herein by reference.

FIELD OF THE INVENTION

The invention relates to an indicator lamp for a room occupancy sensor which indicates a bypass on or off mode, or a timed out mode, as well as motion detection and the sufficiency of the ambient light level in the operating area of the sensor.

BACKGROUND OF THE INVENTION

Many commercial, industrial and government facilities require a significant number of lighting fixtures for adequate illumination, and therefore use a significant amount of power to operate the lighting fixtures. A number of facilities use lighting control systems to control when the lighting fixtures are energized and thereby reduce the amount of power that is consumed to light these facilities. Lighting control systems can include passive infrared (PIR) wall switch sensors that can be used to automatically power up incandescent or fluorescent lighting fixtures upon detection of occupant motion, and to power down the fixtures after a predetermined period of time has elapsed following the last instance of detected motion. This period of time shall hereinafter be referred to as the time out (TO) period.

In addition to a motion detector such as a PIR sensor and a control input to set the TO period, an occupancy sensor can be provided with an ambient light sensor and control input therefor. The ambient light sensor and control input can be used to select a minimum level of light above which a lighting fixture is prevented from being switched and powered on following detected motion. Thus, the lighting control system operates in a daylight inhibit mode when the ambient light level is sufficient to render the switching of the lamp unnecessary.

An existing occupancy sensor provides two indicators (e.g., two different colored light emitting diodes or LEDs) to indicate detected motion, and to indicate whether or not the ambient light level is sufficient to render the illumination of the fixture unnecessary following detected motion. The indicators are two LEDs and are disclosed in U.S. Pat. No. 5,699,243 which is commonly assigned to Hubbell Incorporated of Orange, Conn. and expressly incorporated herein by reference. As shown in FIG. 1, a red LED 24 is operated in a solid illumination mode when the lighting fixture associated with the occupancy sensor is powered down and the lighting control system is not in the daylight inhibit mode. The red LED 24 is toggled off when motion is detected. The green 26 LED is driven in a solid illumination mode when the lighting fixtures are powered down and then toggled when motion is detected to indicate that the lighting control system is in the daylight inhibit mode. In other words, the lighting fixture will not be powered on following motion detection because the ambient light level is sufficient. Thus, the red and green LEDs provide feedback to a user regarding the lighting control system's functional state, and aid remotely located customer service personnel when helping an occupant identify which mode the system is in and whether or not it is malfunctioning.

Exisiting room occupancy sensors are disadvantageous because TO period adjustment and operation cannot be controlled to maintain lighting fixtures in an active or inactive state regardless of detected motion and ambient light level. For example, setting the ambient light level for daylight inhibit mode can be difficult if lighting fixtures are switched on during the level setting process. The operation of the lighting fixtures during this process changes the detected amount of ambient light level to a higher footcandle level than desired. A need exists for a system which temporarily bypasses operation of the lighting control system in response to detected motion and which provides an indication of this bypass mode of operation, among other functions.

SUMMARY OF THE INVENTION

The above described disadvantage is overcome and a number of advantages are realized by a room occupancy sensor constructed in accordance with the present invention. A room occupancy sensor is provided which operates in a bypass on or off mode. A bypass off mode is provided to maintain lighting fixtures in a powered down state regardless of whether motion is detected, allowing for an accurate ambient light level to be set, among other advantages. A bypass on mode is provided to power up the lighting fixtures (e.g., in case of an emergency) even though the ambient light level may be sufficient to inhibit switching on the lighting fixtures during normal operating conditions. In accordance with an aspect of the present invention, an indicator is provided to indicate whether a room occupancy sensor is operating in a bypass on or off mode, or is operating in a mode wherein the lighting fixtures are automatically powered down after a selected TO period following motion detection.

In accordance with another aspect of the present invention, the indicator provides an indication of detected motion and whether or not the current ambient light level is sufficient to inhibit powering up the lighting fixtures following motion detection.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENT

Figures 1, 2A:
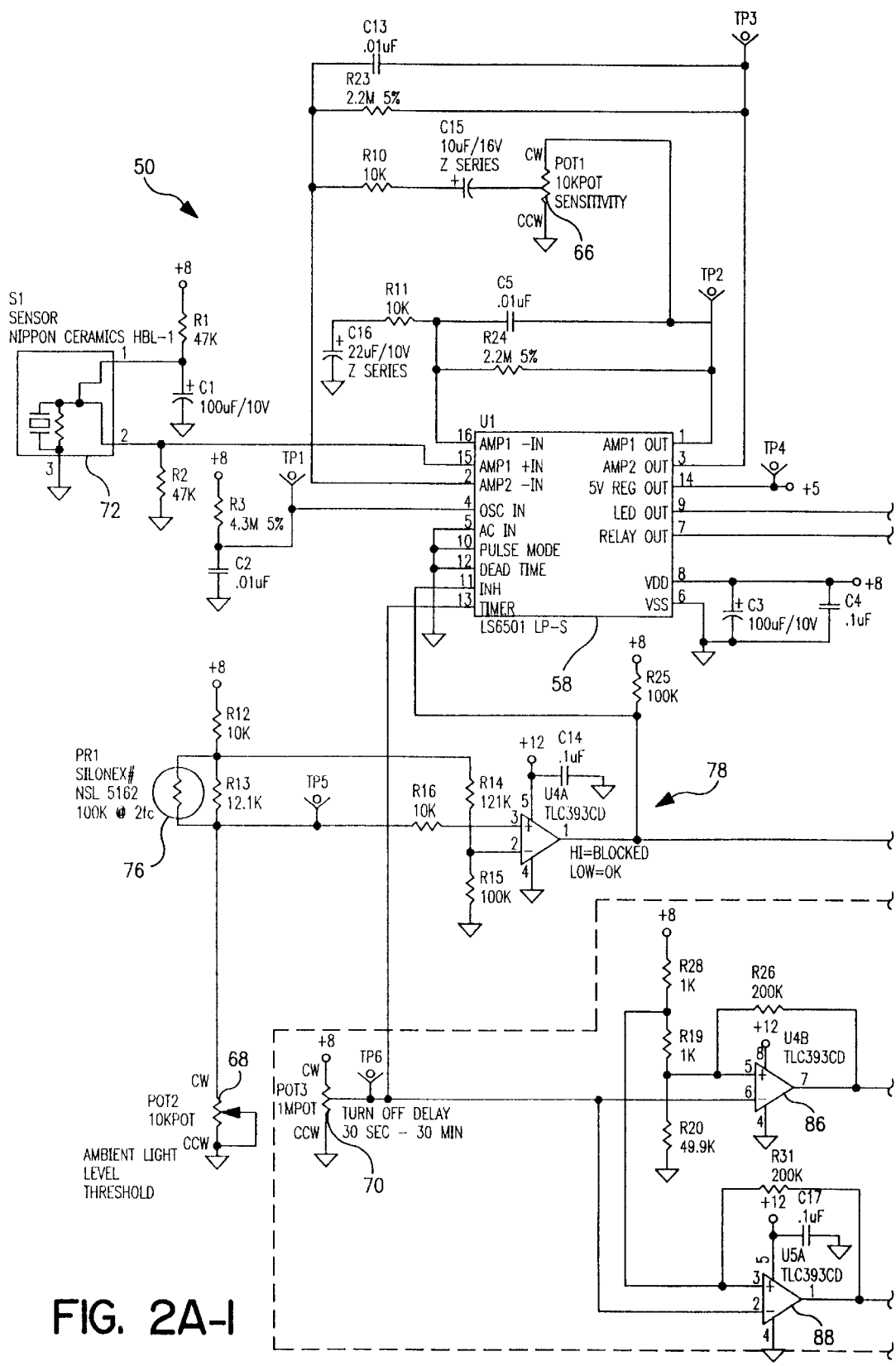
FIGS. 2A and 2B are schematic circuit diagrams of a room occupancy sensor constructed in accordance with an embodiment of the present invention.
Figures 2, 2A:
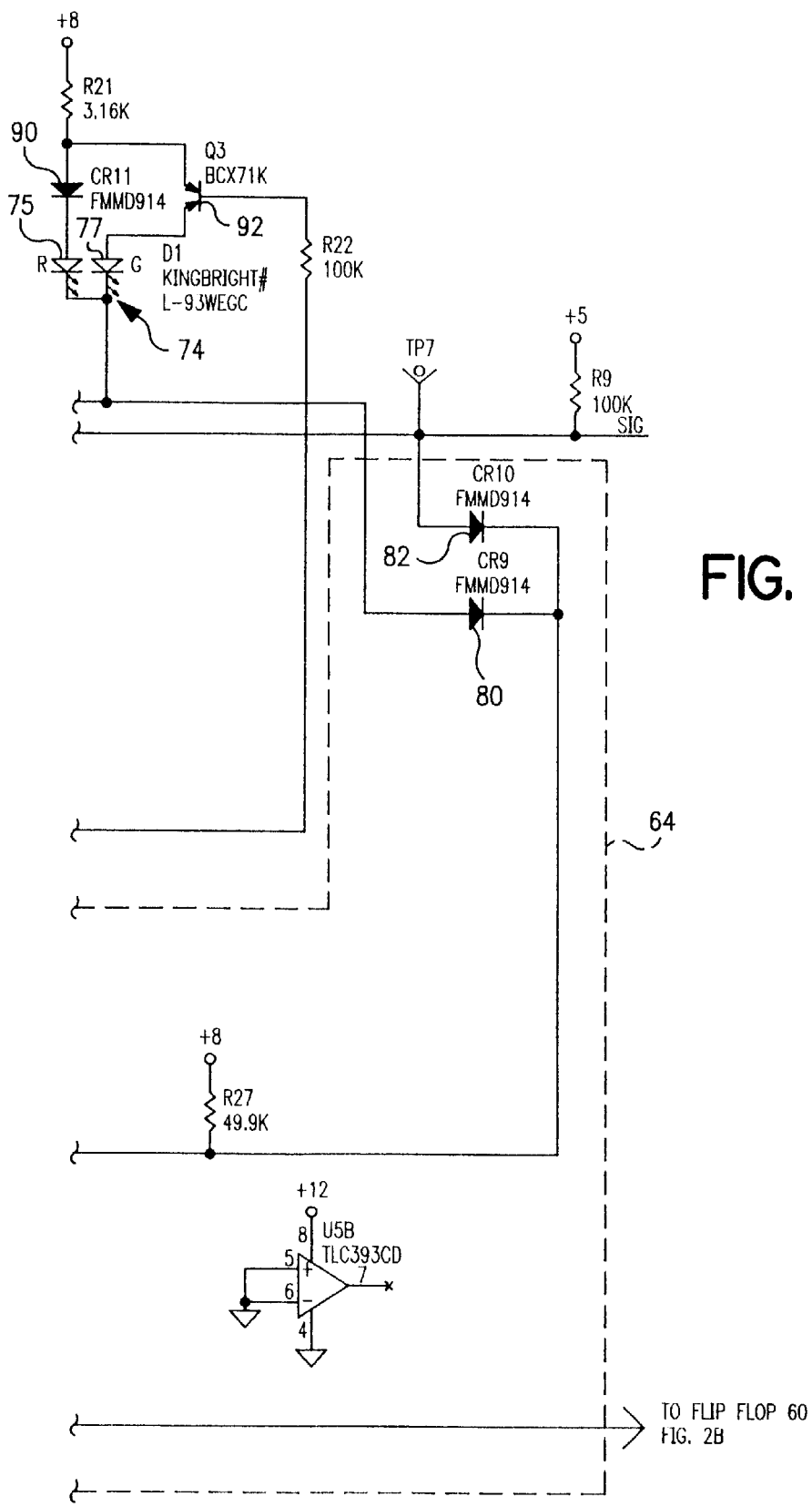
Figures 2, 2B:
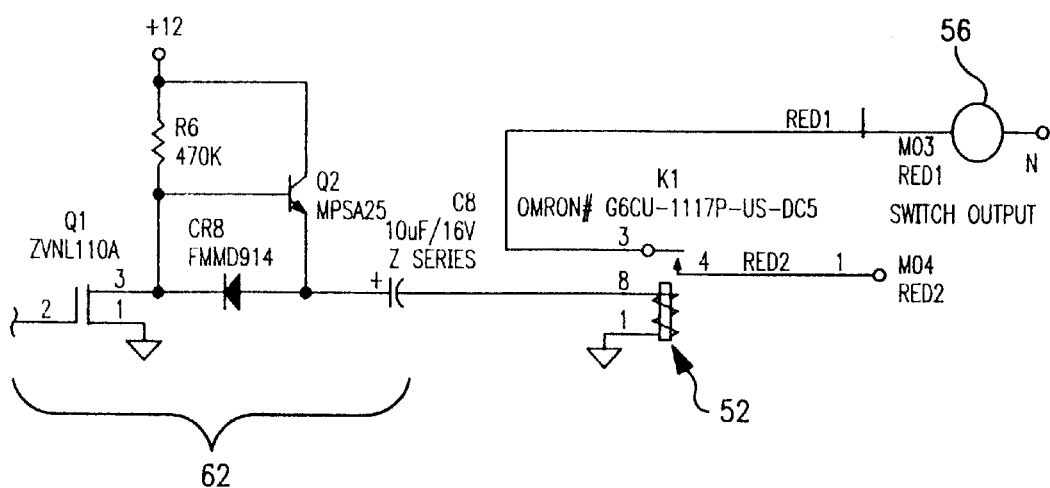

FIGS. 2A and 2B depict a room occupancy sensor constructed in accordance with the present invention. The room occupancy sensor (ROS) 50 comprises a relay K1 indicated at 52 in FIG. 2B that is controllably switched as described below to interrupt or provide power from the power source 54 to a load such as a lighting fixture 56. The control signal for determining whether the lighting fixture 56 will be powered up or down is generated by a microprocessor 58 (FIG. 2A). The control signal output of the microprocessor 58 is indicated as SIG and is applied to an input of a flip flop 60 (FIG. 2B). The flip flop 60 is provided in a relay control circuit indicated generally at 62. The flip flop 60 in the relay control circuit 62 has a set input that is connected to an output of a bypass on/off mode control circuit indicated generally at 64 in FIG. 2A.

Figure 1:
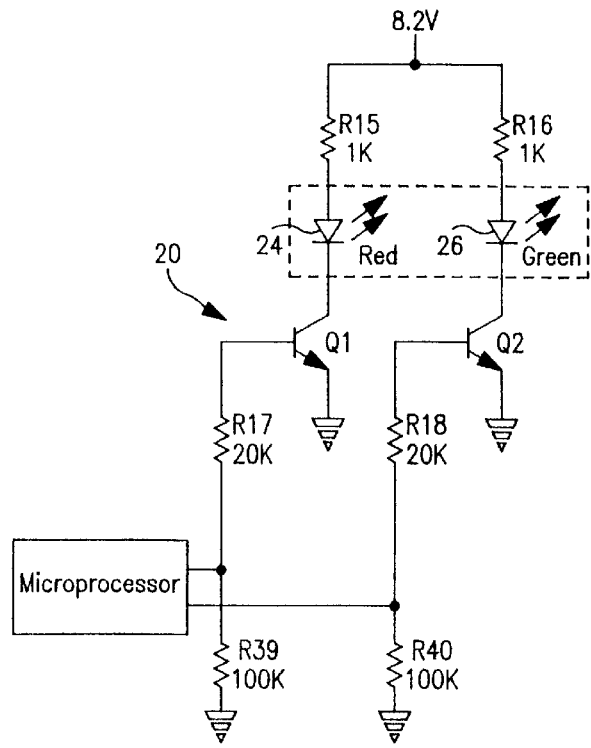
FIG. 1 is a schematic circuit diagram of a conventional room occupancy sensor indicator having two independently driven light emitting diodes.
Figure 3:
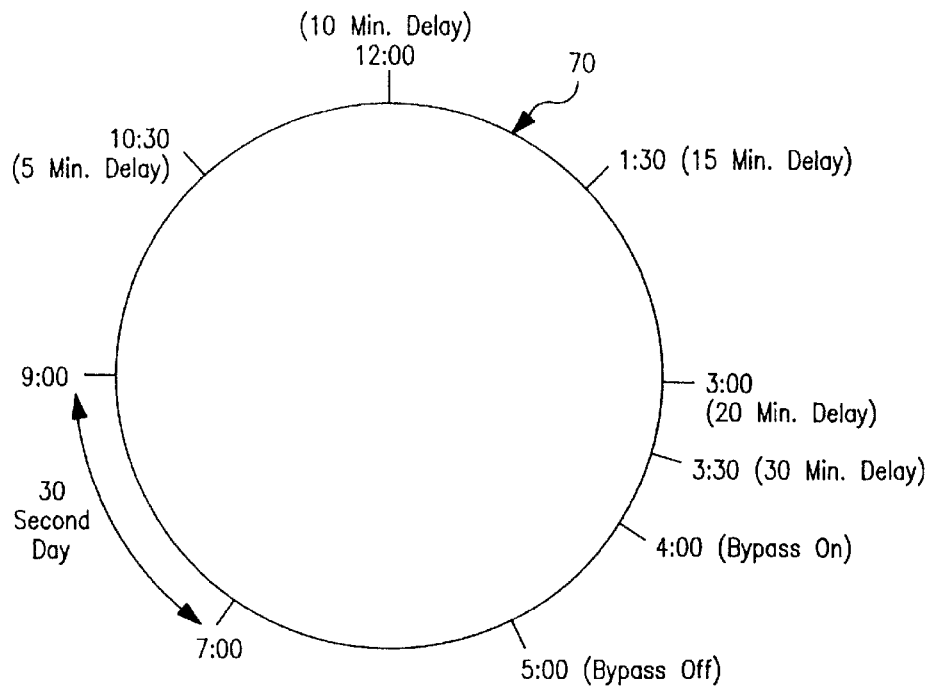
FIG. 3 depicts an input control device for selecting between bypass off, bypass on, and automatic time out modes of operation for a room occupancy sensor constructed in accordance with an embodiment of the present invention.

The ROS 50 comprises a number of potentiometers 66, 68 and 70 that allow a user to control functions such as setting the ambient light level, the sensitivity of the motion detector and for selecting a time out period length. The potentiometer 66 is for setting the sensitivity of a motion sensor such as a passive infrared sensor 72. The potentiometer 68 allows a user to set a desired ambient light level threshold. Exemplary settings for the potentiometer 70 are depicted in FIG. 3. The potentiometer 70 allows a user to select between bypass off mode, bypass on mode or automatic timeout mode. These modes will be described in further detail below with reference to the bypass on/off control circuit 64. It is to be understood that the bypass off and on modes can be selected using another control input to the ROS 50 such as either of the potentiometers 66 and 68. The outputs of the potentiometers 66, 68 and 70 are provided to the microprocessor 58 which is programmed to control the relay 52 and other components of the ROS 50 depending on the settings of the potentiometers.

The ROS 50 comprises a bicolor LED 74. In accordance with the present invention, the bicolor LED provides a visual indication of whether the ROS 50 is operating in a bypass on or off mode, as opposed to the automatic time out mode, whether the ambient light level threshold has been met (that is, powering the lighting fixtures via the relay 52 is inhibited) and whether motion is detected. The ROS 50 comprises a ambient light sensor 76 and daylight inhibit control circuit 78 which is connected to the bicolor LED 74.

With continued reference to FIG. 2A, the microprocessor 58 has a number of ports which will now be described. The motion detector 72 and its sensitivity potentiometer 66 are connected to ports 1, 2, 3, 15 and 16 of the microprocessor 58, which are labeled AMP1 OUT, AMP2 IN, AMP2 OUT, AMP1 +IN AND AMP1 −IN, respectively. The microprocessor 58 has a pin 9 (i.e., LED OUT) connected to the bicolor LED 74 and to the bypass on/off mode control circuit 64 via a diode 80. The microprocessor 58 has a RELAY OUT port at pin 7 which is connected to a control line labeled as SIG. The control line SIG is connected to the D-type flip flop 60 in the relay control circuit 62. A diode 82 is connected between the control line SIG and the bypass on/off mode control circuit 64. As will be described in more detail below, the diodes 80 and 82 are operable in connection with the bypass on/off mode control circuit 64 to override the control line SIG when one of the bypass off mode or the bypass on mode is selected via the potentiometer 70.

The daylight inhibit control circuit will now be described. A comparator 84 is provided which has one input connected to the potentiometer 68 and another input connected to the ambient light sensor 76. The output of the comparator 84 is high as long as the light level detected by the ambient light sensor 76 exceeds the threshold selected via the potentiometer 68. The output of the comparator 84 is provided as an input to the microprocessor 58. The microprocessor 58 is programmed to inhibit the output of a signal on the control line SIG even though motion may have been detected. When the detected ambient light level falls below the ambient light level threshold selected via the potentiometer 68, the comparator output becomes low. Accordingly, the microprocessor 58 does not inhibit the application of a signal generated on the control line SIG pursuant to programmed control, allowing for the lighting fixture to be switched on via the relay 52. If the ROS 50 energizes the relay 52 (i.e., the lighting fixture is powered on) and the ambient light level is sufficient to inhibit the microprocessor 58 from powering the lighting fixture, the relay 52 remains on with continued motion detection. In other words, the ambient light level threshold inhibits energization of the relay 52 if the relay was already switched off.

FIG. 3 illustrates exemplary settings of the potentiometer 70 for setting the TO period, as well as selecting the bypass on or off mode. The setting positions can be compared to the face of a clock. In the illustrated example, the 30 second TO period setting is any position between approximately the 7:00 and 9:00 clock positions. The 5 minute TO period setting is at approximately the 10:30 clock position. The 10 minute TO period setting is at approximately the 12:00 clock position. The 15 minute TO period setting is at approximately the 1:30 clock position. The 20 minute TO period setting is at approximately the 3:00 clock position. The 30 minute TO period setting is at approximately the 3:30 clock position. The bypass on mode and the bypass off mode positions are at approximately the 4:00 and 5:00 clock positions, respectively.

The bypass on/off mode control circuit 64 will now be described. When the potentiometer 70 is turned entirely clock wise, the outputs of comparators 86 and 88 are both low in accordance with the bypass off mode. The output of the comparator 88 is connected to the set input of the flip flop 60. Since the D-type flip flop has an active low jam-type set input, the output to the relay 52 is prevented. Thus, the lighting fixture is powered down.

When the potentiometer 70 is turned slightly counter clock wise to the bypass on mode position, the output of the comparator 88 changes to a high output by virtue of a connection of one input to the node between the voltage divider resistors R28 and R19. Accordingly, the output of the flip flop 60 is controlled depending on the signal on the control line SIG. In the bypass on mode, the relay 52 is operated to maintain the lighting fixture in the powered on state. Since the output of the comparator 86 remains low, the output level on the control line SIG is maintained low. Thus, the output of the flip flop 60 is low, which allows an FET Q1 to be biased and have a high output. The transistor Q2 is therefore biased to allow the relay K1 to be energized. Other relay control circuits can be used in lieu of the relay control circuit 62 in the illustrated embodiment such as a transistor circuit as disclosed in the aforementioned copending application of Nishihira et al. for "Apparatus and Method for Providing Bypass Functions For A Motion Sensor Switch."

Thus, the ROS 50 is configured to operate in a bypass off mode or a bypass on mode. The bypass off mode is advantageous when, for example, a user is adjusting the potentiometer 68 to set a desired ambient light level threshold. The user would not want the lighting fixture to be switched on due to detected motion, for example, while adjusting the potentiometer 68. The bypass on mode is advantageous, for example, during an emergency when it is useful for lighting fixtures to remain powered on and to not be automatically powered down after a particular time out period.

When the potentiometer 70 is adjusted further clock wise from the bypass on mode position, the outputs of both comparators 86 and 88 become high outputs. When the outputs of the comparators are both high, the diodes 80 and 82 are nonconductive. Thus the level of the signal SIG provided to the input of the flip flop 60 is determined as per the programming of the microprocessor 58 in determining whether or not the relay 52 will be energized.

The bicolor LED 74 is operated in accordance with the present invention to indicate whether the ROS 50 is in the bypass on or off mode, or in the automatic time out mode. In addition, the bicolor LED 74 is configured to indicate motion detection, and whether or not the ambient light is sufficient to inhibit operating the relay 52 to power on the lighting fixture 56 when motion is detected. The following table is an example of how the bicolor LED can be operated to indicate these different modes. It is to be understood that the LEDs can be flashed at different cycles, or different colors can be used, to indicate detected motion, and the different modes and ambient light conditions in accordance with the present invention.

TABLE

BICOLOR LED FUNCTIONS

| Mode | Devices |
| --- | --- |
| Bypass OFF | Lighting Fixture OFF regardless of motion detection |
| | Steady Green LED When Ambient Light Sufficient |
| | Steady Red LED When Ambient Light Is Insufficient |
| Bypass ON | Lighting Fixture ON Even If No Motion Is Detected |
| | Steady Green LED If Ambient Light Sufficient |
| | Steady Red LED If Ambient Light Is Insufficient |
| Automatic TO Period | Lighting Fixture ON If Motion Detected |
| | Blinking Green LED If Ambient Light Sufficient And Motion Detected |
| | Blinking Red LED If Insufficient Ambient Light And Motion Is Detected |

The bicolor LED device 74 is controlled by the potentiometer 68, the ambient light sensor 76 and the microprocessor 58. The microprocessor 58 can control the cycling of the current through the LEDs 75 and 77 in the automatic time out mode because the diodes 80 and 82 are rendered nonconductive. The LEDs 75 and 77 of the bicolor LED device 74 are prevented from conducting current simultaneously via the diode 90 and the bias current provided to the transistor 92 from the daylight inhibit control circuit 78. When the output of the daylight inhibit control circuit 78 is high, the transistor 92 conducts and shorts out the branch of the bicolor LED 74 containing the red LED 75. When the output of the daylight inhibit control circuit is low (i.e., the detected ambient light level falls below the threshold set via the potentiometer 68), the transistor 92 is not biased. Accordingly, the green LED 77 is disabled while the red LED draws current and illuminates.

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A method of operating an indicator device in a lighting control system, the lighting control system comprising a lighting fixture, a switching device for controllably switching the lighting fixture on and off in accordance with control signals from a controller, a motion detector for detecting motion, and a controller operable to switch the lighting fixture on when motion is detected and to switch the lighting fixture off when a selected period of time has elapsed following the last detected motion, the method comprising the steps of:

providing a first indication via said indicator device when said lighting control system is in one of a bypass off mode and a bypass on mode, said lighting control system operating in a bypass off mode when said lighting fixture is not switched on after said motion is detected, said lighting control system operating in said bypass on mode when said lighting fixture is switched on even though motion is not detected; and providing a second indication via said indicator device when said lighting control system is in a time out mode, said lighting control system operating in a time out mode when said lighting fixture is switched off after said selected period of time has elapsed following the most recent occurrence of detected motion, said first indication and said second indication being different.

2. A method as claimed in claim 1, wherein said indicator device is a light emitting device, one of said providing step for said first indication and said providing step for said second indication comprises the step of operating said light emitting device to provide a steady illuminated output, and the other one of said providing step for said first indication and said providing step for said second indication comprises the step of operating said light emitting device to provide a pulsed illuminated output when motion is detected.

3. A method as claimed in claim 1, wherein said lighting control system comprises an ambient light detector and an ambient light control input for selecting an ambient light level above which said lighting fixture operates in an inhibit mode and is not switched on via a relay following motion detection, and said providing for said first indication comprises the step of controlling said indicator device to operate in a first mode when said ambient light level is exceeded and in a second mode when said ambient light level is not exceeded.

4. A method as claimed in claim 3, wherein said indicator device is one of a bicolor light emitting device and a visual indicator comprising at least two lighting emitting devices that are operated independently via said controller, said indicator device being operable to provide a first color output in said first mode and a second color output in said second mode.

5. A method as claimed in claim 4, wherein one of said providing step for said first indication and said providing step for said second indication comprises the step of operating said indicator device to provide a steady illuminated output, and the other one of said providing step for said first indication and said providing step for said second indication comprises the step of operating said indicator device to provide a pulsed illuminated output when motion is detected.

6. An indicator apparatus for a lighting control system, said lighting control system comprising a lighting fixture, and a switching device for controllably switching the lighting fixture on and off, said indicator apparatus comprising:

a controller programmed to generate control signals to control said switching device;

a motion detector for detecting motion and providing an output signal indicating detected motion to said controller, said controller being operable to switch said lighting fixture on when said motion is detected and to switch said lighting fixture off when a selected period of time has elapsed following the most recent occurrence of said detected motion; and an indicator device for providing a first indication when said lighting control system is in one of a bypass off mode and a bypass on mode, said lighting control system operating in a bypass off mode when said lighting fixture is not switched on after said motion is detected, said lighting control system operating in said bypass on mode when said lighting fixture is switched on even though motion is not detected;

wherein said indicator device provides a second indication when said lighting control system is in a time out mode, said lighting control system operating in a time out mode when said lighting fixture is switched off after said selected period of time has elapsed following the most recent occurrence of detected motion, said first indication and said second indication being different.

7. An indicator apparatus as claimed in claim 6, wherein said indicator device is a light emitting device, one said first indication and said second indication being generated by operating said light emitting device to provide a steady illuminated output, and the other one of said first indication and said second indication being generated by operating said light emitting device to provide a pulsed illuminated output when motion is detected.

8. An indicator apparatus as claimed in claim 6, wherein said lighting control system comprises an ambient light detector and an ambient light control input for selecting an ambient light level above which said lighting fixture operates in an inhibit mode and is not switched on via a relay following motion detection, said indicator device being configured to operate in a first mode when said ambient light level is exceeded and in a second mode when said ambient light level is not exceeded.

9. An indicator apparatus as claimed in claim 8, wherein said indicator device is one of a bicolor light emitting device and a visual indicator comprising at least two lighting emitting devices that are operated independently via said controller, said indicator device being operable to provide a first color output in said first mode and a second color output in said second mode.

10. An indicator apparatus as claimed in claim 9, wherein one of said first indication and said second indication is generated by operating said indicator device to provide a steady illuminated output, and the other one of said first indication and said second indication being generated by operating said indicator device to provide a pulsed illuminated output when motion is detected.

* * * * *